(12) United States Patent
Ye et al.

(10) Patent No.: US 10,843,076 B2
(45) Date of Patent: Nov. 24, 2020

(54) GAME PROGRAM, CONTROL METHOD FOR COMPUTER, AND COMPUTER

(71) Applicant: GREE, Inc., Tokyo (JP)

(72) Inventors: Ruoyi Ye, Tokyo (JP); Hiroki Kamobayashi, Tokyo (JP)

(73) Assignee: GREE, Inc., Tokyo (JP)

( * ) Notice: Subject to any disclaimer, the term of this patent is extended or adjusted under 35 U.S.C. 154(b) by 489 days.

(21) Appl. No.: 14/833,704

(22) Filed: Aug. 24, 2015

(65) Prior Publication Data
US 2016/0059131 A1 Mar. 3, 2016

(30) Foreign Application Priority Data

Aug. 27, 2014 (JP) .................................. 2014-173282
Jan. 8, 2015 (JP) .................................. 2015-002496
Mar. 24, 2015 (JP) .................................. 2015-061648

(51) Int. Cl.
*A63F 13/537* (2014.01)

(52) U.S. Cl.
CPC .... *A63F 13/537* (2014.09); *A63F 2300/6045* (2013.01)

(58) Field of Classification Search
CPC ...... A63F 13/10; A63F 13/428; A63F 13/537; G06T 19/20
See application file for complete search history.

(56) References Cited

U.S. PATENT DOCUMENTS 7,819,732 B2 * 10/2010 Asuna ..................... A63F 13/10
463/7
9,138,641 B2 * 9/2015 Rogers ..................... A63F 13/10
2013/0016093 A1 * 1/2013 Ueno ....................... G06T 19/20
345/419

FOREIGN PATENT DOCUMENTS

| JP | 2008-154793 A | 7/2008 |
| JP | 2011101677 A | 5/2011 |
| JP | 2011136049 A | 7/2011 |
| JP | 5688486 B | 3/2015 |

OTHER PUBLICATIONS

Japanese Office Action dated Feb. 10, 2015 in family Japanese Application No. 2015-002496; 8 pgs.

(Continued)

*Primary Examiner* — David L Lewis
*Assistant Examiner* — Robert E Mosser
(74) *Attorney, Agent, or Firm* — Maier & Maier, PLLC

(57) ABSTRACT

There is provided a computer that implements an input function of accepting rotation operation information for an operation object having a three-dimensional form in a graphical scene so as to enable output of display information for a certain face of the operation object; a target object display output function of outputting display information for displaying a target face of a target object that includes a corresponding face corresponding to a specific face of the operation object; an operation object display output function of outputting the display information for the certain face of the operation object that is rotated by the input function; and a form determination function of determining whether the operation object and the target object correspond to each other by comparing the certain face of the operation object rotated by the input function with the target face of the target object.

17 Claims, 9 Drawing Sheets

(56) References Cited

OTHER PUBLICATIONS

Japanese Office Action dated Jun. 16, 2015 in family Japanese Application No. 2015-061648; 11 pgs.
Japanese Office Action dated Aug. 25, 2015 in family Japanese Application No. 2015-128172; 8 pgs.
Japanese Office Action dated Nov. 18, 2014 in corresponding Japanese Application No. 2014-173282; 4 pgs.
"Kurupita 3D" Rotate and fit a solid figure into a background silhouette, Flash Game Ichinichi Ichizen, Aug. 22, 2012, URL: http://flashgametoday.jp/2012/08/22050000.php.
"Kurupita 3D" Get a sense of achievement—A puzzle game of rotating and fitting a 3D block into a silhouette, Favroid, Oct. 8, 2012, URL: http://favroid.com/free/spgame32/.
Puzzle Game Algorithm Maniacs, Softbank Creative Corp., Jul. 31, 2008, First Printing of First Edition, pp. 123 to 138 and 400.

\* cited by examiner

GAME PROGRAM, CONTROL METHOD FOR COMPUTER, AND COMPUTER

FIELD

The present invention relates to a game program and so on for performing a process to make a game proceed.

BACKGROUND

With the widespread use of electronic devices, such as smartphones and tablet terminals, games for such electronic devices, in addition to those for home video game machines, are actively being developed. Among a number of games of various genres that are being developed, three-dimensional puzzle games have gained popularity recently, and numerous three-dimensional puzzle games are being developed.

For example, Japanese Unexamined Patent Application Publication No. 2011-101677 discloses a game apparatus that runs a game using eight types of regular hexahedrons which are displayed as three-dimensional computer graphics. Japanese Unexamined Patent Application Publication No. 2011-136049 discloses a puzzle game in which a puzzle is solved by arranging a plurality of displayed images and guessing the whole picture of an object that is present in virtual space.

Existing three-dimensional puzzle games have shortcomings in that their rules and operation are too complicated. For example, the game apparatus described in Japanese Unexamined Patent Application Publication No. 2011-101677 provides a puzzle game in which a plurality of regular hexahedrons having complex regularity are rotated, which is difficult to play. Similarly, in the puzzle game described in Japanese Unexamined Patent Application Publication No. 2011-136049, operations needed to play the puzzle game are complicated, and therefore, the puzzle game is also difficult to play.

Regarding games, such as existing three-dimensional puzzle games, where players need to understand complicated rules or perform complicated operations, players may hesitate to start playing the games and tend to become tired of continuously playing the games. Accordingly, it is desired to implement a quick enjoyable three-dimensional game by simplifying rules and operation while maintaining the attractiveness of three-dimensional games.

SUMMARY

Exemplary embodiments described herein are made in view of the above-described shortcomings and an objective thereof is to provide a game program and so on with which a game having good viewability and intuitive operability in a three-dimensional graphical scene as well as increased attractiveness can be implemented.

In order to address the above-described shortcomings, a game program according to aspects of exemplary embodiments is a game program for performing a process to make a game proceed, the game program allowing a computer to implement: an input function of accepting rotation operation information for an operation object having a three-dimensional form in a graphical scene so as to enable output of display information for a certain face of the operation object; a target object display output function of outputting display information for displaying a target face of a target object that includes a corresponding face corresponding to a specific face of the operation object; an operation object display output function of outputting the display information for the certain face of the operation object that is rotated by the input function; and a form determination function of determining whether the operation object and the target object correspond to each other by comparing the certain face of the operation object rotated by the input function with the target face of the target object.

In the game program according to aspects of exemplary embodiments, display information may be output with which the certain face and/or the target face are displayed in an enhanced manner so as to be easily visible to a player in contrast to the other faces of the operation object and/or the target object.

In the game program according to aspects of exemplary embodiments; the certain face and/or the target face may be displayed in an enhanced manner by displaying the operation object and/or the target object in near two-dimensions.

In the game program according to aspects of exemplary embodiments, the certain face and/or the target face may be displayed in an enhanced manner by reducing an angle of view of the operation object and/or the target object relative to a viewpoint of a player to a specific angle of view and displaying the operation object and/or the target object.

The game program according to aspects of exemplary embodiments may allow the computer to further implement a generation function of generating screen information about a game screen with which progress of the game is grasped.

The game program according to aspects of exemplary embodiments may allow the computer to further implement a map generation function of generating, in another graphical scene that includes content of the graphical scene, a map of the graphical scene in association with screen information generated by a generation function.

The game program according aspects of exemplary embodiments may allow the computer to further implement an acceleration obtaining function of obtaining, from an acceleration measurement unit, information about an acceleration to which a terminal that is operated by a player is being subjected as the rotation operation information accepted by the input function. In a rotation operation performed by the input function, the operation object may be rotated in accordance with the information about an acceleration obtained by the acceleration obtaining function.

In the game program according to aspects of exemplary embodiments, in a rotation operation performed by the input function, the operation object may be rotated so as to mate one of a front face, a back face, a left face, a right face, a top face, and a bottom face of the operation object face forward and to orient one of an upper side, a lower side, a left side, and a right side of the one of the faces of the operation object up.

The game program according to aspects of exemplary embodiments may cause the computer to further implement a limitation function of placing a limitation on a time period during which the operation object is rotatable in a rotation operation performed by the input function and/or on the number of times the operation object is rotatable in a rotation operation performed by the input function.

In the game program according to aspects of exemplary embodiments, the limitation function may set a time based on a speed at which at least one of the operation object and the target object moves and a distance from the operation object to the target object as a time limit.

The game program according to aspects of exemplary embodiments may cause the computer to further implement an object moving function of moving at least one of the operation object and the target object along at least one of three axes of three dimensions so as to make the operation object and the target object approach each other.

The game program according to aspects of exemplary embodiments may cause the computer to further implement a bonus offering function of offering a certain bonus to a player in a case where the form determination function determines that the operation object and the target object correspond to each other.

In the game program, according to aspects of exemplary embodiments, the operation object and/or the target object, may each be constituted by a plurality of object elements, and each of the plurality of object elements may be associated with attribute information.

In the game program, according to aspects of exemplary embodiments, the attribute information may be information indicating a form, a color, a pattern, or a combination thereof of each of the plurality of object elements.

In the game program according to aspects of exemplary embodiments, the form determination function may determine whether the operation object and the target object correspond to each other by comparing the certain face of the operation object with the target face of the target object and determining whether part or all of the target face matches the certain face.

In the game program according to aspects of exemplary embodiments the form determination function may determine whether the operation object and the target object correspond to each other by comparing the certain face of the operation object with the target face of the target object and determining whether one of the operation object and the target object fits into the other.

In the game program according to aspects of exemplary embodiments, the form determination function may determine whether the operation object and the target object correspond to each other by comparing the certain face of the operation object with the target face of the target object and determining whether part or all of attribute information about the target face matches attribute information about the certain face.

In order to address the above-described shortcomings, a control method for a computer according to aspects of exemplary embodiments can include: an input step of accepting rotation operation information for an operation object having a three-dimensional form in a graphical scene so as to enable output of display information for a certain face of the operation object; a target object display output step of outputting display information for displaying a target face of a target object that includes a corresponding face corresponding to a specific face of the operation object; an operation object display output step of output ting the display information for the certain face of the operation object that is rotated in the input step; and a form determination step of determining whether the operation object and the target object correspond to each other by comparing the certain face of the operation object rotated in the input step with the target face of the target object.

In order to address the above-described shortcomings, a computer according to aspects of exemplary embodiments can further include: an input unit that accepts rotation operation information for an operation object having a three-dimensional form in a graphical scene so as to enable output of display information for a certain face of the operation object; a target object display output unit that outputs display information for displaying a target face of a target object that includes a corresponding face corresponding to a specific face of the operation object; an operation object display output unit that outputs the display information for the certain face of the operation object that is rotated by the input unit; and a form determination unit that determines whether the operation object and the target object correspond to each other by comparing the certain face of the operation object rotated by the input unit with the target face of the target object.

With the game program, the control method for a computer, and the computer according to aspects of exemplary embodiments, the certain face of the operation object having a three-dimensional form and rotated by the input function of accepting rotation operation information may be compared with the target face of the target object having a three-dimensional form to thereby determine whether the operation object and the target object correspond to each other in the graphical scene of the game having three-dimensional information. Accordingly, the game program and so on produces an effect of increasing the attractiveness of the game because of good viewability and intuitive operability in the three-dimensional graphical scene.

BRIEF DESCRIPTION OF THE DRAWINGS

Exemplary

Exemplary

Exemplary

Exemplary

Exemplary

Exemplary

Exemplary

Exemplary

Exemplary

Exemplary

DETAILED DESCRIPTION

First, a configuration according to a first exemplary embodiment will be described with, reference to FIGS. 1 to 8 where a computer may function as a portable terminal, and a game program may be executed on the portable terminal as a native application (native game).

Next, a configuration according to a second exemplary embodiment will be described with reference to FIG. 9, where the computer may function as a server apparatus, part or all of the game program, may be executed on the server apparatus as a Web application (Web game), and a result of a process that has been performed is returned to the portable terminal.

The first embodiment of the present invention will be described with reference to exemplary FIGS. 1 to 3.

A game provided according to aspects of the exemplary embodiments is a game in which a score may be given in a case where it is determined that an operation object having a three-dimensional form and a target object having a three-dimensional form, correspond to each other in a graphical scene of the game having three-dimensional information.

Figure 1:
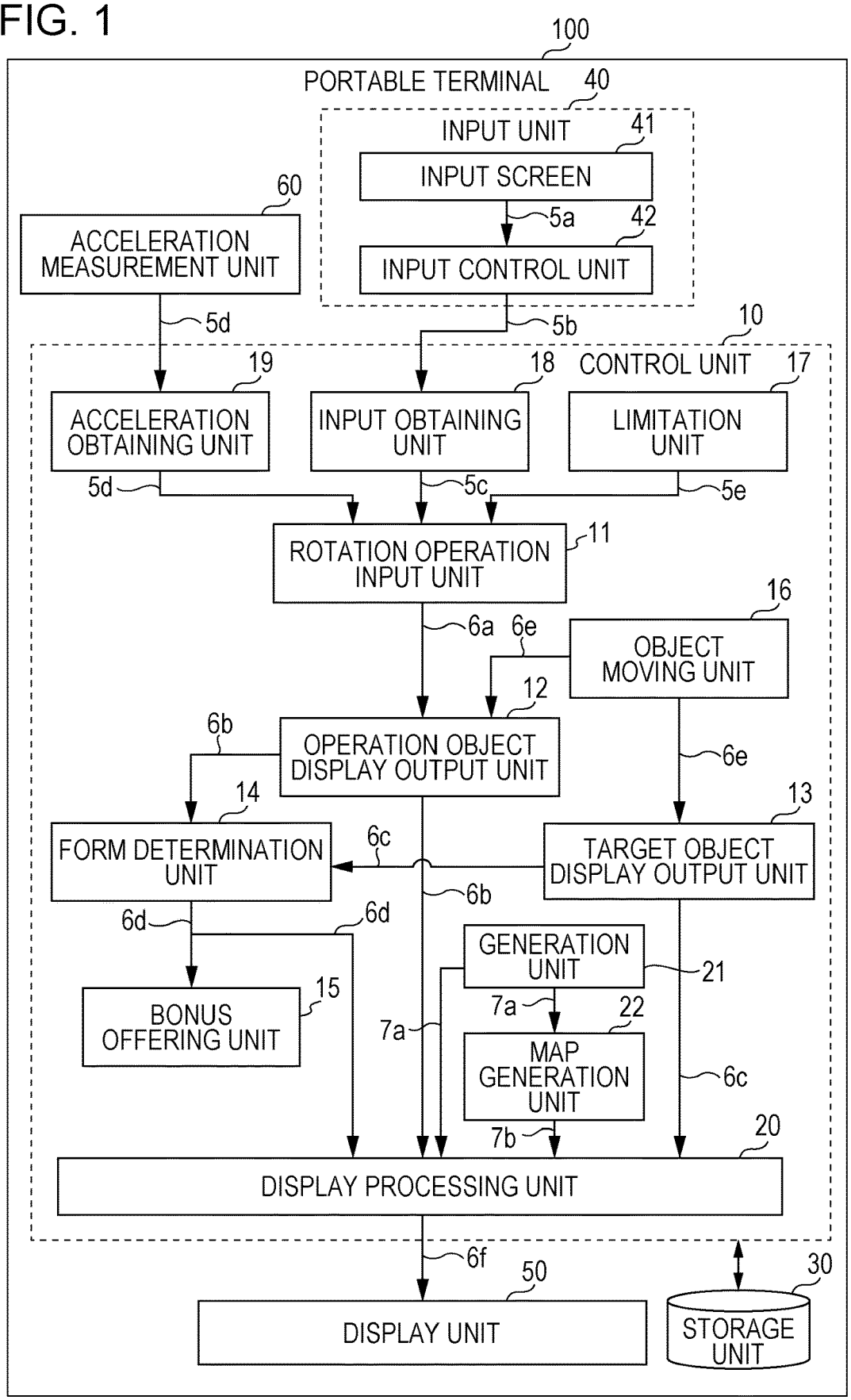
FIG. 1 is a block diagram illustrating a configuration of principal parts of a portable terminal according to an embodiment of the present invention.

FIG. 1 is a block diagram illustrating an example of a configuration of principal parts of a portable terminal 100. The portable terminal (computer) 100 may be an information processing apparatus that may be able to execute a game program according to this embodiment. It may be appreciated that the information processing apparatus may be any device that cars perform a process relating to the game program, and can be implemented as a smartphone, a tablet terminal, a portable telephone (feature phone), a home video game machine, a personal computer, or other known electronic devices, as well as the portable terminal 100.

As illustrated in exemplary FIG. 1, the portable terminal 100 can include a control unit 10 (a rotation operation input unit 11, an operation object display output unit 12, a target object display output unit 13, a form determination unit 14, a bonus offering unit 15, an object moving unit 16, a limitation unit 17, an input obtaining unit 18, an acceleration obtaining unit 19, a display processing unit 20, a generation unit 21, and a map generation unit 22), an input unit 40 (an input screen 41 and an input control unit 42), a display unit 50, a storage unit 30, and an acceleration measurement unit 60.

The control unit 10 may control, partially or entirely, various functions of the portable terminal 100. The control unit 10 can include the rotation operation input unit 11, the operation object display output unit 12, the target object display output unit 13, the form determination unit 14, the bonus offering unit 15, the object moving unit 16, the limitation unit 17, the input obtaining unit 18, the acceleration obtaining unit 19, the display processing unit 20, the generation unit 21, and the map generation unit 22.

In this exemplary embodiment, the rotation operation input unit (input function of accepting rotation operation information) 11 can accept rotation operation information so that a certain face of the operation object having a three-dimensional form is visible to a player in the graphical scene of the game having three-dimensional information. In a rotation operation performed by the rotation operation input unit (input function of accepting rotation operation information) 11, the operation object can be rotated in a certain direction so that one of the front face, the back face, the left face, the right face, the top face, and the bottom face of the operation object faces forward and one of the upper side, the lower side, the left side, and the right side of the face of the operation object that faces forward is oriented up.

The positional relationships among the faces of the operation object can be changed by a flipping operation. For example, the positional relationships among the faces of the operation object may be changed by flipping the operation object vertically or horizontally. Accordingly, operations including a flipping operation as well as a rotation operation can be performed, and therefore, variations of operations performed by the player on the operation object may be increased, and the attractiveness of the game can be further increased.

It may be noted, in some exemplary embodiments, that rotation operation information 6a output from the rotation operation input unit (input function of accepting rotation operation information) 11 is input into the operation object display output unit 12.

The target object display output unit (target object display output function) 13 can output display information for displaying a target face of the target object. It may be desired, in some examples, that the target object can include a corresponding face that may correspond to a specific face of the operation object. Further, it may be desired, in some examples, that the target face of the target object be displayed in an enhanced manner so as to be easily visible to the player in contrast to the other faces of the target object, which will be described below. More specifically, in some examples, despite the target object having a three-dimensional form, the target object may be displayed in quasi-three dimensions so that the target object is substantially displayed in two dimensions or may be displayed in near two dimensions. In other words, the angle of view of the target object having a three-dimensional form relative to the viewpoint of the player may be reduced to a specific angle of view.

Further, it may be appreciated that, in some exemplary embodiments, target object display output information 6c output from the target object display output unit 13 is input into the form determination unit 14 or into the display processing unit 20.

The operation object display output unit (operation object display output function) 12 may output the operation object that is displayed at a specific angle of view relative to the viewpoint of the player, and can output display information for the certain face of the rotated operation object on the basis of the rotation operation information accepted by the rotation operation input unit (input function of accepting rotation operation information) 11. It may be desired, in some examples, that the certain face of the operation object be displayed in an enhanced manner so as to be easily visible to the player in contrast to the other faces of the operation object, which will be described below. That is, it may be desired, in some examples, that, despite the operation object having a three-dimensional form, the operation object be displayed in quasi-three dimensions so that the operation object is substantially displayed in two dimensions or may be displayed in near two dimensions. In other words, it may be desired that the angle of view of the operation object having a three-dimensional form relative to the viewpoint of the player is reduced to a specific angle of view.

In some exemplary embodiments, it may be appreciated that operation object display output information 6b output from the operation object display output unit 12 may be input into the form determination unit 14 or into the display processing unit 20.

The operation object and/or the target object may each be constituted by any number of object elements, and each of the object elements may be associated with attribute information. Attribute information may be information indicating the form, color, or pattern of each object element or information indicating a combination thereof.

The form determination unit (form determination function) 14 can determine whether the operation object and the target object correspond to each other by comparing the certain face of the operation object rotated by the rotation operation input unit (input function of accepting rotation operation information) 11 with the target face of the target object. More specifically, in an exemplary embodiment where the target object includes a corresponding face that corresponds to a specific face of the operation object, if the certain face of the operation object corresponds to the target face of the target object, it can be determined that the operation object and the target object correspond to each other.

In some further examples, it may be appreciated that the target object display output information 6c output from the target object display output unit 13 or the operation object display output information 6b output from the operation object display output unit 12 can be input into the form determination unit 14, and form determination information 6d indicating that the form determination unit 14 determines that the operation, object and the target object correspond to each other (match) can be output to the bonus offering unit 15 or to the display processing unit 20.

The generation unit (generation function) 21 can generate game progress screen information 7a about a game screen with which the progress of the game can be grasped, which will be described in detail below.

The map generation unit (map generation function) 22 can generate a map of the graphical scene in association with the game progress screen information 7a generated by the generation unit (generation function) 21, in smother graphical scene that includes content of the graphical scene, which will be described in detail below.

In some further examples, the game progress screen information 7a output from the generation unit 21 can be input into the map generation unit 22 or into the display processing unit 20. Map generation screen information 7b output from the map generation unit 22 can be input into the display processing unit 20.

The acceleration obtaining unit (acceleration obtaining function) 19 can obtain information about an acceleration to which a terminal that is operated by the player is being subjected, from the acceleration measurement unit 60 as rotation operation information accepted by the rotation operation input unit (input function of accepting rotation operation information) 11. In a rotation operation performed by the rotation operation input unit (input function of accepting rotation operation information) 11, a rotation in a certain direction can be performed in accordance with the information about an acceleration obtained by the acceleration obtaining unit (acceleration obtaining function) 19.

In some further examples, acceleration information 5d obtained from the acceleration measurement unit 60 can be input into the acceleration obtaining unit 19, and the acceleration information 5d can be output to the rotation operation input unit 11.

The limitation unit (limitation function) 17 can place a limitation on a time period during which a rotation in a certain direction can be performed and/or on the number of times a rotation in a certain direction can be performed in a rotation operation performed by the rotation operation input unit (input function of accepting rotation operation information) 11. The limitation unit (limitation function) 17 can set a time that is determined on the basis of the speed at which at least one of the operation object and the target object moves and the distance from the operation object to the target object as a time limit.

In some further examples, limitation information 5e that includes information about the limited time period and/or number of times output from the limitation unit 17 can be input into the rotation operation input unit 11.

The object moving unit (object moving function) 16 can move at least one of the operation object and the target object along at least one of the three axes of three dimensions so that the operation object and the target object approach each other.

In some further examples, movement information 6e for moving the operation object or the target object, which may be output from the object moving unit 16, can be input into the target object display output unit 13 or into the operation object display output unit 12.

The bonus offering unit (bonus offering function) 15 can offer a certain bonus to the player in a case where the form determination unit (form determination function) 14 determines that the operation object and the target object correspond to each other.

The display processing unit 20 can generate screen information 6f about a game screen, with which a result of a series of processing can be shown to the player, on the basis of the target object display output information 6c input from the target object display output unit 13, the operation object display output information 6b input from the operation object display output unit 12, the form determination information 6d input front the form determination unit 14, the game progress screen information 7a input from the generation unit 21, and the map generation screen information 7b input from the map generation unit 22, and can output the screen information 6f to the display unit 50 to thereby display the game screen on the display unit 50.

The input unit 40 can accept an operation performed by the player. In this exemplary embodiment, the input unit 40 may be a touch panel, although any other similar input device may be utilized, as desired. The input unit 40 can include the input screen 41 and the input control unit 42. Note that a method for input into the portable terminal 100 is not limited to a touch operation using the touch panel; input can be provided by pressing a certain input key, for example, or any other desired input manner.

The input screen 41 may be a device (a touch screen included in the touch panel, for example) which is able to detect a position specified by the player performing an operation. The input screen 41 can output a touch signal 5a that corresponds to the specified position to the input control unit 42.

The input control unit 42 can generate coordinate information 5b that can include information about coordinates on the input screen 41 on the basis of the touch signal 5a input from the input screen 41. The input control unit 42 can output the coordinate information 5b to the input obtaining unit 18.

The input obtaining unit 18 can obtain input data from the payer, generate instruction information (input data) 5c on the basis of the coordinate information 5b input from the input control unit 42, and output the instruction information 5c to the rotation operation input unit 11.

The display unit 50 may be a device that displays a game screen. In this exemplary embodiment, the display unit 50 may be a liquid crystal display, although it is envisioned that any other type of display may be utilized with the exemplary embodiments described herein. Additionally, in exemplary FIG. 1, the input unit 40 and the display unit 50 are separately illustrated in order to explicitly indicate functions that the two units respectively have. However, in a case where the input unit 40 is a touch panel, and the display unit 50 is a liquid crystal display, for example, it may be desired that the two units be integrated into one unit.

The storage unit 30 may be a storage device constituted by any recording medium, such as a hard disk, a silicon state drive (SSD), a semiconductor memory, a digital versatile disc (DVD), or the like, and can store the game program with which the portable terminal 100 is controllable and various types of data.

Figure 2C:
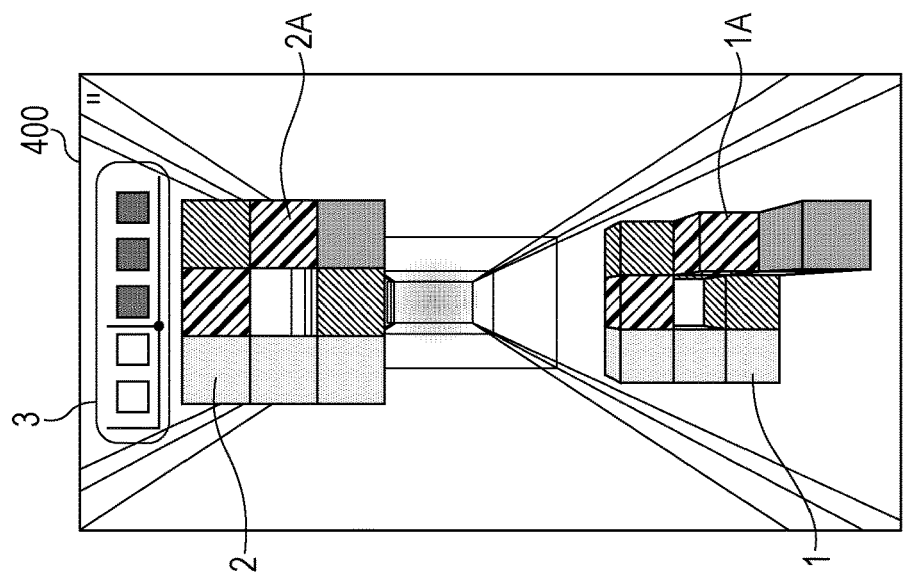
FIG. 2c is a schematic diagram of an exemplary game screen displayed on a display unit included in the portable terminal of illustrates a state where a player matches the attitude of the operation object with the attitude of the target object, and is provided for describing a certain face of the operation object and a target face of the target object.
Figure 2B:
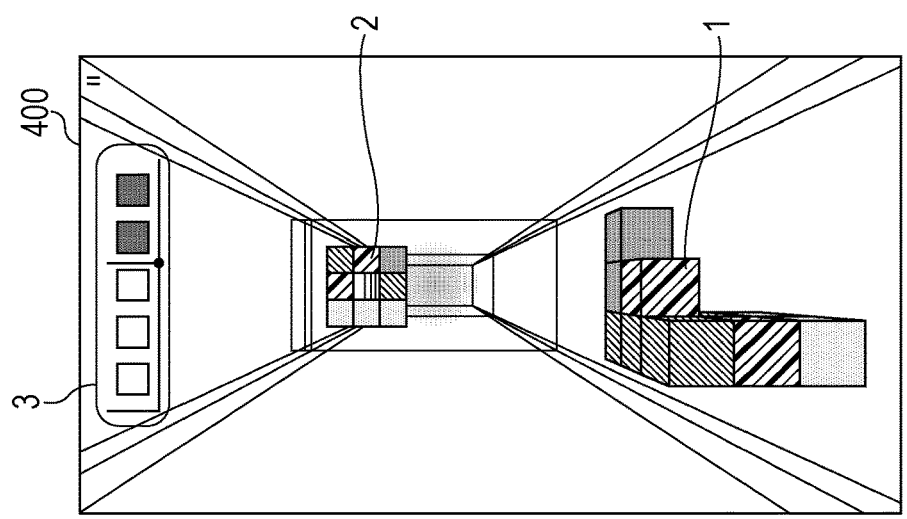
FIG. 2b is a schematic diagram of an exemplary game screen displayed on a display unit included in the portable terminal of illustrates a state where the target object is further approaching the operation object.
Figure 2A:
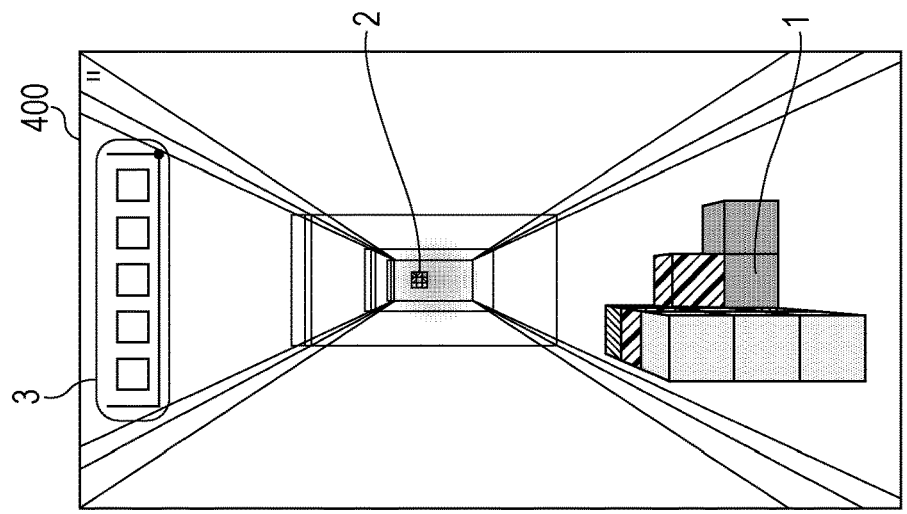
FIG. 2a is a schematic diagram of an exemplary game screen displayed on a display unit included in the portable terminal of a state where a target object is approaching an operation object.

Exemplary FIGS. 2a to 2c are schematic diagrams illustrating transitions of a game screen 400 in a puzzle game implemented by the game program according to the first embodiment of the present invention.

Exemplary FIG. 2a is a schematic diagram illustrating a state where a target object 2 is approaching an operation object 1. Exemplary FIG. 2b is a schematic diagram illustrating a state where the player rotates the operation object 1 by performing a rotation operation while the target object 2 is further approaching the operation object 1. Exemplary FIG. 2c is a schematic diagram illustrating a state where the player matches the attitude of the operation object 1 with the attitude of the target object 2 by performing a rotation operation, and is provided for describing a certain face of the operation object 1 and a target face of the target object 2. Attitude, which can be interpreted as position, posture, movement, or the like, as non-limiting examples.

As illustrated in exemplary FIGS. 2a through 2c, the operation object 1 and the target object 2 can be displayed on the game screen 400. The portable terminal 100 can display the operation object 1 having a certain form so as to be visible from a certain direction in the graphical scene of the game having three-dimensional information. Similarly, the portable terminal 100 can display the target object 2 having a form (similar form, for example) that relates to part or all of the certain form. The player may input, into the input unit 40, an operation (change operation) for changing the attitude of the operation object 1 to thereby match the attitude of the operation object 1 that is displayed on the near side (on the near side in the depth direction of the game screen 400 displayed on the display unit 50, for example, directly in front of the player) with the attitude of the target object 2 that is moving from far in front of the operation object 1 (from the far side in the depth direction of the game screen 400 displayed on the display unit 50) to the near side (that is, approaching the operation object 1).

In a further exemplary embodiment, the player can perform an operation so that a certain face 1A of the operation object 1 is displayed as illustrated in exemplary FIG. 2c. The certain face 1A can correspond to the form of the operation object 1 when the operation object 1 is viewed from the front (from the near side to the far side in the depth direction of the game screen 400 on the display unit 50). Similarly, a target face 2A can correspond to the form of the target object 2 when the target object 2 moving from far in front of the operation object 1 to the near side is viewed from the front.

In some exemplary embodiments, it may be desired that the certain face 1A be displayed in an enhanced manner so as to be easily visible to the player in contrast to the other faces (left face, right face, top face, bottom face, and back face) of the operation object 1, as illustrated in exemplary FIG. 2c. More specifically, it may be desired that the operation object 1 be displayed in near two dimensions so that the angle of view relative to the viewpoint of the player is reduced. In the first exemplary embodiment, the operation object 1 has an attitude so that one of the six faces (front face, back face, left face, right face, top face, and bottom face) illustrated in exemplary FIG. 4, which will be described below, of the operation object 1 is substantially displayed. In exemplary FIG. 2c, a perspective view of the operation object 1 is illustrated where the front face among the six faces is fully displayed while the top face among the six faces that indicates the depth is displayed so as to be slightly visible.

Note, in some exemplary embodiments, that the certain face 1A may be displayed so as to represent one of the six faces, in other words, so that the angle of view is 0°. As described above, it may be desired that the certain face 1A be displayed in near two dimensions, even if the operation object 1 has a form that includes a curved surface or an irregularity. Specifically, in some exemplary embodiments, the form including a curved surface or an irregularity may be displayed as if the form is projected on a two-dimensional plane.

Similarly, in some exemplary embodiments, the target face 2A of the target object 2 may be displayed in an enhanced manner so as to be easily visible to the player in contrast to the other faces of the target object 2, as illustrated in exemplary FIG. 2c. More specifically, it may be desirable that the target object 2 be displayed in near two dimensions so that the angle of view relative to the viewpoint of the player is reduced. In the first exemplary embodiment, the target object 2 is displayed so that the angle of view is 0°. That is, only the front face among the six faces of the target object 2 may be displayed.

In some exemplary embodiments, a perspective view of the target object 2 may be displayed so that, as the target face 2A, the front face among the six faces is fully displayed while the top face among the six faces that indicates the depth is displayed so as to be slightly visible. As described above, it my be desired that the target face 2A be displayed in near two dimensions even if the target object 2 has a three-dimensional form that includes a curved surface or an irregularity.

It say further be noted that in a mode where the certain face 1A of the operation object 1 and/or the target face 2A of the target object 2 are displayed in an enhanced manner in contrast to the other faces thereof, the colors of the certain face 1A and/or the target face 2A may be changed so as to contrast with the other faces. Alternatively, the other faces may be transparently displayed or the certain face 1A and/or the target face 2A may be transparently displayed.

As described above, by displaying the certain face 1A and the target face 2A that are to correspond to each other in order for the game to proceed in an enhanced manner in contrast to the other faces, the player can be provided with good visibility. As a result, the player can get a grasp of the objects more intuitively, which leads to increased operability, and the attractiveness of the game can be further increased.

On the game screen 400, a block group 3 that may be constituted by a number of blocks and that can indicate a time period during which a rotation operation can be performed on the operation object 1, can be displayed. That is, screen information about the game screen with which the progress of the game cars be grasped can be displayed. The blocks in the block group 3 may disappear from the rightmost one as time proceeds. At the time point when all of the blocks disappear, the game can terminate in the stage. On the other hand, if the stage is cleared while one or more blocks remain, a bonus that corresponds to the number of remaining blocks can be offered.

In this way, by indicating the progress of the game by using a group of blocks having a form similar to the object operated by the player instead of a number or the like, the sense of being engrossed in the game can be further increased.

Figure 3:
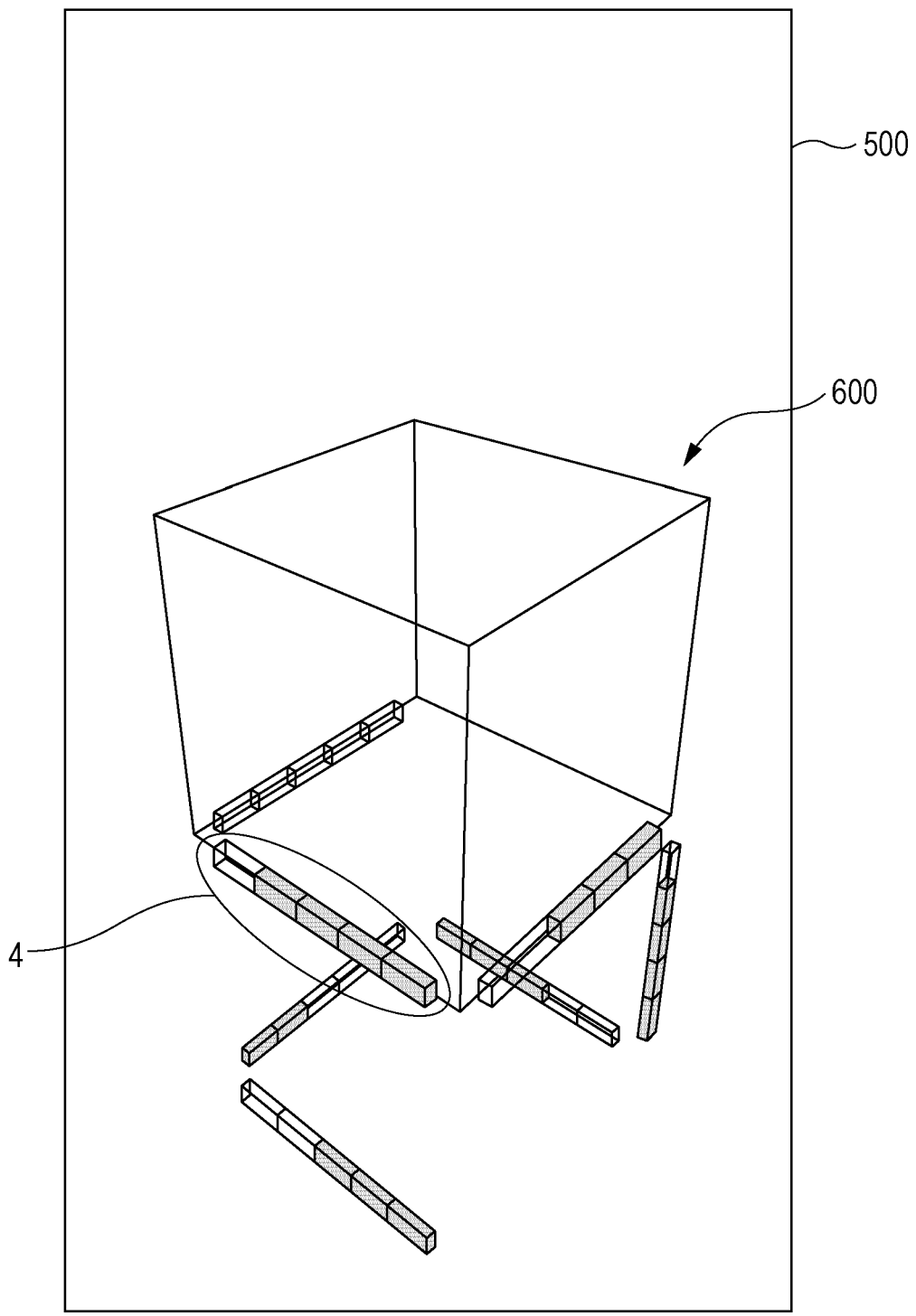
FIG. 3 is a schematic diagram, illustrating a map screen in a puzzle game implemented by a game program, according to an embodiment of the present invention.

Exemplary FIG. 3 is a schematic diagram illustrating a map screen 500 in the puzzle game implemented by the game program according to the first embodiment of the present invention.

As illustrated in exemplary FIG. 3, a cube 600 can be displayed on the map screen 500. Each side of the cube 600 can correspond to one stage. In the example illustrated in FIG. 3, a configuration can be employed in which gameplay proceeds clockwise along the sides of the cube 600 from bottom to top. When the player selects one of the sides, the map screen 500 can transition to the game screen 400.

Note, in this example, that the map screen 500 may seamlessly transition to the game screen 400 without switching of the screen from the map screen 500, by expanding a side selected by the player and changing the viewpoint of the player. In this way, transition between screens is seamlessly performed without interrupting viewability, and therefore, the sense of being engrossed in the game can be further increased.

On each side of the cube 600, the clear state of the stage that has been cleared can be displayed. The clear state can be represented by a block group 4 that may be constituted by a plurality of blocks. Specifically, the number of remaining blocks in the block group 3 illustrated in exemplary FIG. 2 can be equal to the number of blocks highlighted in the block group 4 illustrated in exemplary FIG. 3.

Specifically, the clear state can be displayed such that, when the player clears a stage on the game screen 400, the remaining blocks in the block group 3 move to the block group 4 on the map screen 500 and are highlighted.

With the configuration described above, the player can play the game by aiming to highlight all blocks on each side of the cube 600, and therefore, the player's motivation can be increased.

In a case where the player highlights all blocks on the map screen 500, at bonus can be offered such that the game proceeds to a special stage or a special reward is offered, for example.

The object displayed on the map screen 500 may not be limited to a cube, and any form, such as that of a tree or a maze, or any other shape or indicia, can be displayed. When the player takes a path along the sides, the path can be a non-branched path or a branched path.

Like the cube 600 illustrated in exemplary FIG. 3, the map screen 500 that is an aggregate of a plurality of stages can be displayed in three dimensions. In doing so, the visibility of connections among the plurality of stages and branches can be increased. The direction or position of a stage on the map screen 500 may have a meaning. For example, stages represented by sides that are headed to the top of the map screen 500 (vertical sides of the cube 600 in exemplary FIG. 3, for example) may constitute a main stage group in which, the game proceeds. Stages represented by sides that are headed in the depth direction (horizontal sides of the cube 600 in exemplary FIG. 3, for example) may constitute a bonus stage group in which more rewards can be obtained but which has no relation to the progress of the game, or may constitute a sub-stage which complements the progress of the game in the main stages. Exemplary FIG. 3 illustrates a state where gameplay proceeds along the sides on a non-branched path; however, the player may deviate from the path and select another side. Further, another path or another cube may appear in a case where gameplay proceeds along all sides of the cube 600 under a certain condition.

Figure 4:
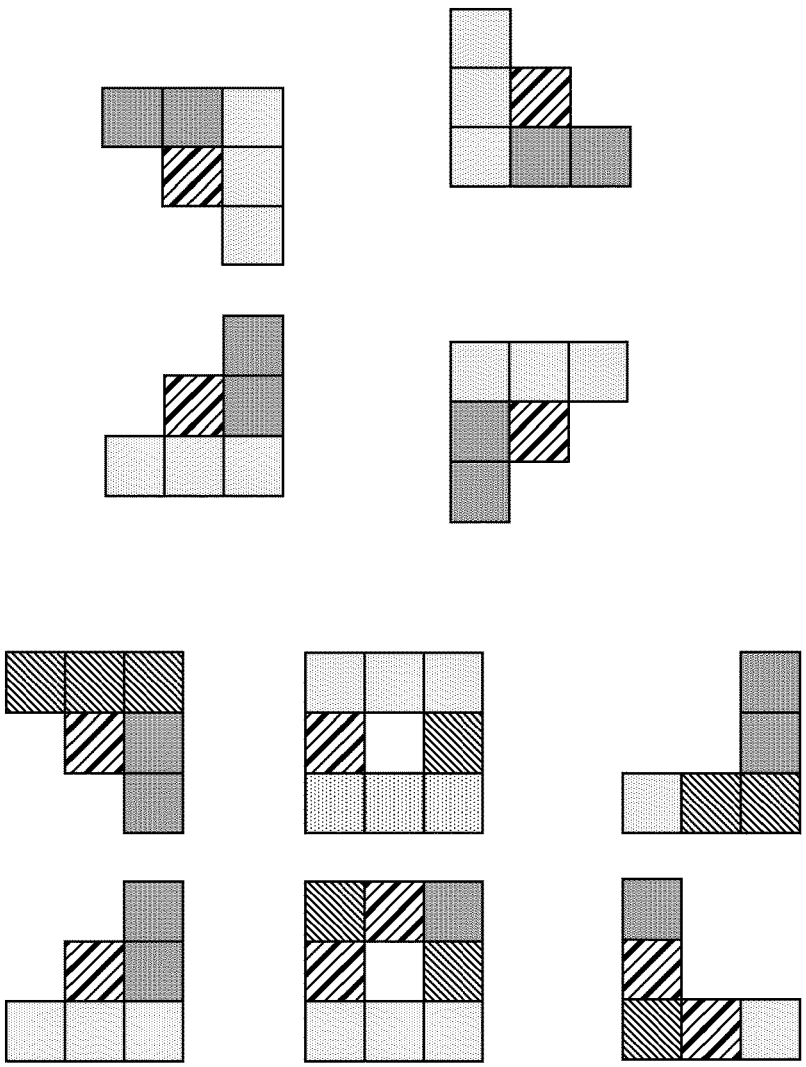
FIG. 4 is a schematic diagram illustrating variations in displaying the operation object in a three-dimensional graphical scene.

Exemplary FIG. 4 is a schematic diagram illustrating variations in displaying the operation object 1 in the three-dimensional graphical scene. As illustrated in exemplary FIG. 4, the operation object 1 having a three-dimensional form can have six faces (front face, back face, left face, right face, top face, and bottom face), and each face can be oriented in any of four orientations (that is, an upper-side up orientation, a lower-side up orientation, a left-side up orientation, and a right-side up orientation). Therefore, the operation object 1 can be displayed in three dimensions (near two dimensions) from 24 (=6×4) directions. Similarly, the target object 2 can be displayed in three dimensions (near two dimensions) from 24 directions.

In the first exemplary embodiment, as the certain face 1A of the operation object 1, one of the 24 faces (which are determined on the basis of the six faces and the four orientations) can be displayed in near two dimensions. Similarly, as the target face 2A of the target object 2, one of the 24 faces (which are determined on the basis of the six faces and the four orientations) can be displayed in near two dimensions.

As illustrated in exemplary FIGS. 2a and 2b, the player may need to find an attitude that corresponds to (matches) the attitude (display direction) of the target object 2 from among 24 attitudes (display directions) that the operation object 1 can have. That is, the player may need to find an attitude in which the certain face 1A of the operation object 1 corresponds to (matches) the target face 2A of the target object 2.

In a case where the player succeeds in finding an attitude that corresponds to (matches) the attitude of the target object 2 before the target object 2 hits the operation object 1, as illustrated in exemplary FIG. 2c, the portable terminal 100 can display a performance of the target object 2 being broken into pieces. In other words, the target object 2 can include a corresponding face that corresponds to a specific face of the operation object 1. In a case where the player succeeds in matching the target face 2A (namely, the corresponding face) of the target object 2 with the certain face 1A (namely, the specific face) of the operation object 1 before the operation object 1 and the target object 2 collide with each other, the player can clear the game.

As described above, the player can continue playing the game only by selecting a certain direction from which the operation object 1 can be displayed (by changing the attitude of the operation object 1) in the three-dimensional graphical scene. Accordingly, the portable terminal 100 can provide a game that is a quick enjoyable game and that has certain attractiveness due to three-dimensional display.

Figure 5:
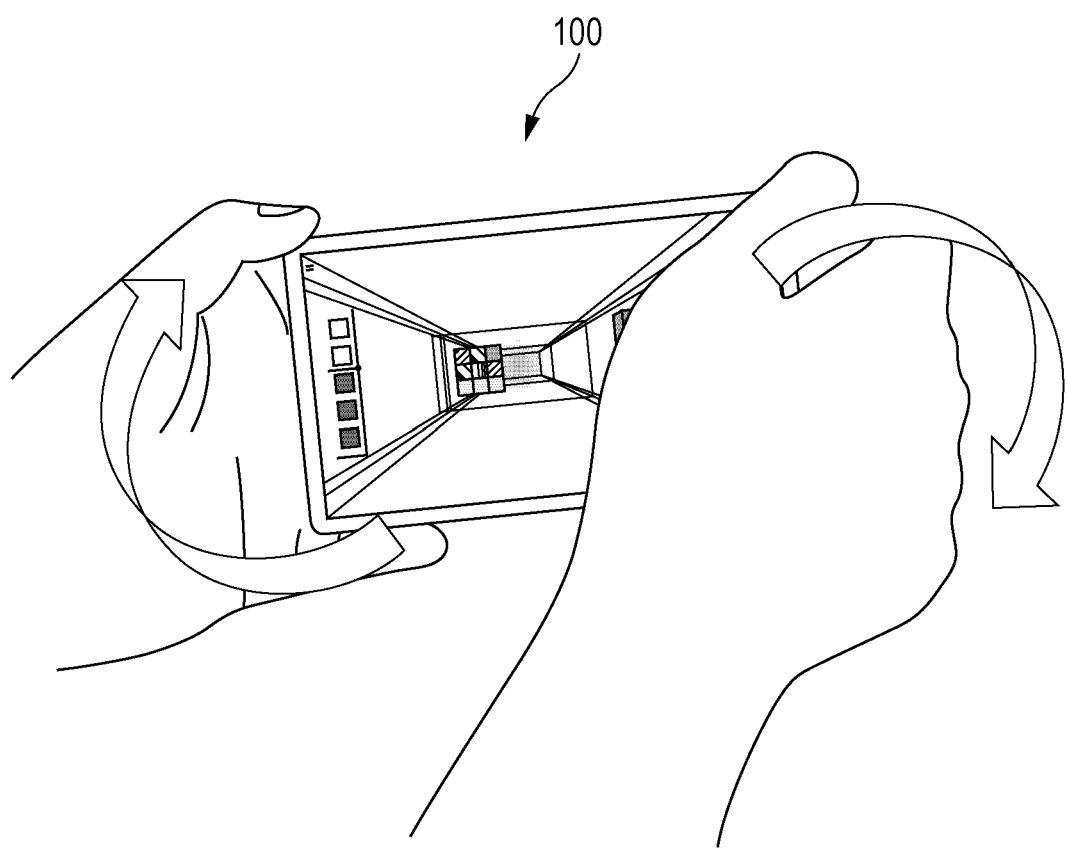
FIG. 5 is a schematic diagram illustrating a state where the player tilts the portable terminal to thereby change a certain direction from which the operation object is displayed.

Exemplary FIG. 5 is a schematic diagram illustrating a state where the player tilts the portable terminal 100 to thereby change the certain direction from which the operation object 1 is displayed. As illustrated in exemplary FIG. 5, the rotation operation input unit 11 can change the certain direction in accordance with the acceleration information 5d input from the acceleration obtaining unit 19.

For example, in a case where the acceleration information 5d indicates that the display unit 50 is being subjected to an acceleration in a downward direction, the rotation operation input unit 11 can change the attitude (display direction) of the operation object 1 so that the operation object 1 rotates in a longitudinal direction in accordance with the acceleration. Similarly, in a case where the acceleration information 5d indicates that the display unit 50 is being subjected to an acceleration in a rightward direction, the rotation operation input unit 11 can change the attitude of the operation object 1 so that the operation object 1 rotates in a lateral direction in accordance with the acceleration. That is, the rotation operation input unit 11 can change the attitude of the operation object 1 in accordance with a direction in which the portable terminal 100 is tilted. Accordingly, the portable terminal 100 can provide the player with an intuitive operation interface.

The operation object display output unit (operation object display output function) 12 can output, to the form determination unit 14 and to the display processing unit 20, the operation object display output information 6b with which the operation object 1 having a certain form is displayed so as to be visible from the certain direction (direction indicated by the rotation operation information 6a input from the rotation operation input unit 11) in the graphical scene of the game having three-dimensional information.

The target object display output unit (target object display output function) 13 can output, to the form determination unit 14 and to the display processing unit 20, the target object display output information 6c with which the target object 2 having a related form relating to the certain form is displayed. Here, the "related form" may be a form similar to the form of the operation object 1, (1-2) a form that includes part of the form of the operation object 1, (1-3) a complementary form that fits into the form of the operation object 1 (like the form of a keyhole into which a key fits), or (1-4) a form that corresponds to part or all of the form of the operation object 1, for example.

Note, in some exemplary embodiments, that the operation object display output unit 12 and/or the target object display output unit 13 can change (2-1) the form of an object (the operation object 1 and/or the target object 2) and/or (2-2) attribute information that is set for each of a plurality of object elements that constitute the object, at a certain timing. For example, in the case of (2-1) described above, the target object display output unit 13 can display the target object 2 so that part or all of the form of the target object 2 expands or contracts. In the case of (2-2) described above, the target object display output unit 13 can display the target object 2 so that the color (attribute information) of part or all of the target object 2 changes. Accordingly, the player may need to consider the timing at which the player is to match the attitude of the operation object 1 with the attitude of the target object 2, and therefore, the portable terminal 100 can make the game more interesting.

The form determination unit (form determination function) 14 can compare the form of the operation object 1 with the form of the target object 2 to thereby determine whether the operation object 1 and the target object 2 correspond to each other.

For example, in a case where the target object 2 has a form similar to the form of the operation object 1 (in the case of (1-1) described above), the form determination unit 14 can determine that the operation object 1 matches the target object 2 if the operation object 1 viewed from a first direction (among the six directions in exemplary FIG. 4 from any of which the operation object 1 is visible) and oriented in a first orientation (among the four orientations in exemplary FIG. 4 in any of which the operation object 1 can be oriented) matches the target object 2 viewed from a second direction (among the six directions in exemplary FIG. 4 from any of which the target object 2 is visible) and oriented in a second orientation (among the four orientations in exemplary FIG. 4 in any of which the target object 2 can be oriented). In a case where the target object 2 has a complementary form that fits into the form of the operation object 1 (in the case of (1-3) described above), the form determination unit 14 compares the form of the operation object 1 with the form of the target object 2 and determines whether one of the operation object 1 and the target object 2 fits into the other (whether the operation object 1 fits into a void (a portion displayed as a blank) of the target object 2, for example).

The form determination unit 14 may determine whether the attributes of the objects as well as the forms of the objects match. In doing so, variations of the game can be increased, and the difficulty level of the game can also be increased. Accordingly, a game that is highly attractive to experienced game players can be provided.

A configuration may be employed in which, in a case where the form determination unit 14 determines that only the attributes of the objects match, a reward different from that offered in a case where both the attributes and the forms of the objects match is offered. With the configuration, the difficulty level, of the game can be adjusted, and the player's enthusiasm, for playing the game can be increased.

That is, the form determination unit 14 can compare the operation object 1 with the target object 2 and determines whether the attitudes (display directions, forms, and the like) of the two objects have a certain relationship (the two objects match, or one of the two objects includes the other, for example). The form determination unit 14 outputs the form determination information 6d that includes a result of determination to the bonus offering unit 15.

Note, in some exemplary embodiment, that the form determination unit 14 can determine whether the attitudes of the two objects have a certain relationship (whether the operation object 1 and the target object 2 correspond to each other) at any timing. For example, the form determination unit 14 may perform determination each time the player inputs a change operation or may perform determination when the player presses (taps) a "determine" button. In a case where the form determination unit 14 determines that, the two objects correspond to each other, the object moving unit 16 can move the target object 2 in the graphical scene rapidly without stopping.

The bonus offering unit (bonus offering function) 15 can offer a certain bonus to the player ins a case where the form determination unit 14 determines that the two objects correspond to each other. Here, a "certain bonus" may be (3-1) one or more points or (3-2) a character or an item that can be used in the game or in other games, for example. In a case where one or more points are offered to the player (in the case of (3-1) described above), the bonus offering unit 15 can offer more points to the player (a) the shorter the time elapsed before the player finds an attitude of the operation object 1 that matches the attitude of the target object 2 and/or (b) the lower the number of times a change operation is performed in order to find the attitude, for example. In this case, the player can trade the obtained points for an item or the like that can be used in other games.

In other exemplary embodiments, in a case where an item or a character is offered to the player (in the case of (3-2) described above), the bonus offering unit 15 can offer to the player an item or a character that is represented by an image relating to an image displayed on part of the target object 2, for example. Here, in a case where an image of a "ribbon" is attached to the surface of the target object 2, for example, the player plays the game while expecting a character to be obtained that is represented by an image of a "girl" (image relating to the image of a "ribbon") and that can be used in other games. In a case where an image of a "dumb-bell" is attached to the surface of the target object 2, the player plays the game while expecting an item to be obtained that is represented by an image of "increased offensive power" (image relating to the image of a "dumb-bell") and that can be used in other games.

Alternatively, part of an image (partial image) of a "ribbon" may be attached to the surface of the target object 2, the partial image may be accumulated each time the player clears one target object 2 (in other words, each time the form determination information 6d indicating that the two objects correspond to each other is input from the form determination unit 14), and the bonus offering unit 15 may offer a character that is represented by an image of a "girl" and that can be used in other games to the player in a case where all partial images that constitute the image of a "ribbon" are collected.

As described above, the portable terminal 100 can offer a bonus to the player in accordance with the progress of the game, and therefore, can increase the player's enthusiasm for playing the game. In particular, in a case where the portable terminal 100 offers an item or a character to the player, it is possible to make the player play the game while giving the player an incentive in the form of the item, or the character. Accordingly, the portable terminal 100 can further increase the player's enthusiasm for playing the game.

In a case inhere the form determination unit 14 determines that the two objects correspond to each other, the bonus offering unit (game proceeding function) 15 makes another game relating to the game proceed. In a case where the other game is a role-playing game (RPG) that unfolds as a character owned by the player battles against an enemy character, for example, the bonus offering unit 15 produces an effect, of doing damage to the enemy character each time the player clears one target: object 2, thereby making the player progress in the other game.

In a case where the player plays the game as a sub-game that is part of a certain main game (another game), the bonus offering unit 15 can make the main game proceed such that the progress of the main game varies in accordance with the number of target objects 2 cleared by the player. In a case where the main game is an RPG described above, for example, the bonus offering unit 15 can produce an effect of recovering the hit points (health) of the character by a certain amount or can produce an effect of skipping an event in the main game (regarding the event as having been cleared) each time the player clears one target object 2. Accordingly, the portable terminal 100 can increase the player's enthusiasm for playing the other game as well as playing the game.

Note, in some examples, that information about a bonus offered by the bonus offering unit 15 may be uploaded to a server apparatus 200 (described below with reference to exemplary FIG. 9) that may be connected to the portable terminal 100 so as to enable communication with each other. Alternatively, a configuration can be employed in which the server apparatus 200 includes the bonus offering unit 15, the portable terminal 100 uploads information about the progress of the game (the number of target objects 2 that have been cleared, for example) to the server apparatus 200, and the bonus offering unit 15 can generate information about a bonus on the server apparatus 200 and stores the information in a certain storage unit.

The object moving unit (object moving function) 16 can move at least one of the operation object 1 and the target object 2 along at least one of the three axes of three dimensions so that the operation object 1 and the target object 2 approach each other.

As illustrated in exemplary FIGS. 2 through 2c, the object moving unit 16 can move the target object 2 displayed far in front of the operation object. 1 that is displayed on the near side so that, the target object 2 approaches the operation object 1. The object moving unit 16 can output, to the operation object display output unit 12 and to the target object display output unit 13, the movement information 6e for moving the operation object 1 or the target object 2.

Note, in some exemplary embodiments, that the object moving unit 16 can move the operation object 1 and/or the target object 2 along a certain guide route (a route like a rail that is set in advance). In a case where the target object display output unit 13 simultaneously displays a plurality of target objects 2, the player can switch the target object 2 that is currently aimed at to another one by switching between a plurality of guide routes along which the plurality of target objects 2 move respectively. The object moving unit 16 can move the operation object 1 and/or the target object 2 while rotating the operation object 1 and/or the target object 2. In this way, the portable terminal 100 can increase variations of the game.

The certain guide route may have an irregularity. In such examples, the object moving unit 16 can rotate the operation object 1 and/or the target object 2 in accordance with the direction and size of the irregularity at a time point when the operation object 1 and/or the target object 2 reaches the irregularity. The certain guide route may be placed a certain limitation (may have a narrow portion, for example), and the object moving unit 16 may display the target object 2 such that the target object 2 cannot pass through the certain guide route and approach the operation object 1 unless the player rotates the target object 2 at a specific timing. The portable terminal 100 may decide to terminate the game at the time when the target object 2 fails to pass through the certain guide route or may reduce the time limit by an amount of time during which the target object 2 fails to approach the operation object 1. In this way, the portable terminal 100 can increase variations of the game and the difficulty level of the game, thereby implementing a game that is worth playing even to skilled players.

The limitation unit (limitation function) 17 can place a limitation on a time period during which the certain direction may be changeable by the rotation operation input unit 11. In a case where the target, object 2 displayed far in front of the operation object 1 that is displayed on the near side moves so that the target object 2 approaches the operation object 1, as illustrated in exemplary FIGS. 2a through 2c, for example, the limitation unit 17 can set a time that is determined on the basis of the speed at which the target object 2 moves and the distance from the operation object 1 to the target object 2 (that is, a time elapsed before the target object 2 hits the operation object 1) as a time limit.

In a case where the player fails to find an attitude of the operation object 1 that matches the attitude of the target object 2 before the target object 2 hits the operation object 1 (within the time limit), the portable terminal 100 can display a performance of the operation object 1 being broken into pieces and further display a message notifying the player that the game is over and a message prompting the player to determine whether to play again (retry) the game.

As described above, the portable terminal 100 can make the player aware of the time limit not by the countdown of the remaining time but in accordance with, the speed at which the target object 2 approaches the operation object 1 and the distance between the two objects, for example. Accordingly, the portable terminal 100 can make the player aware of the time limit more intuitively and give a stronger sense of urgency to the player at the time of playing the game.

Similarly, the limitation unit 17 can place a limitation on the number of times the certain direction is changeable by the rotation operation input unit 11. In this case, the limitation unit 17 increments an accumulated number of times a change is made by one each time the player inputs a change operation into the input unit 40. If the player fails to find an attitude of the operation object 1 that matches the attitude of the target object 2 at the time when the accumulated number of times reaches a specific limited number of times, the limitation unit 17 can decide to terminate the game. Further, the limitation unit 17 can display the accumulated number of times a change is made on the game screen to thereby show the player the accumulated number of times. In doing so, the portable terminal 100 can make the player aware of the limited number of times, thereby giving the player a sense of urgency at the time of playing the game.

The limitation unit 17 can place a limitation on a mode in which the certain direction is changeable by the rotation operation input unit 11. For example, the limitation unit 17 can place a limitation on the mode by displaying a certain object that restricts rotation of the operation object 1 (so as to disable rotation of the operation object 1 in a specific direction or to make the operation object 1 rotate two revolutions when a change operation is input only once). In doing so, the portable terminal 100 can give the player a sense of urgency at the time of playing the game. The limitation unit 17 can output the limitation information 5e that includes information about the limited time period, number of times, and/or mode to the rotation operation input unit 11.

The input, obtaining unit 18 can obtain the coordinate information 5b from the input control unit 42, generates the instruction information 5c on the basis of the coordinate information 5b, and can output the instruction information 5c to the rotation operation input unit 11.

The acceleration obtaining unit (acceleration obtaining function) 19 can obtain information (acceleration information 5d) about an acceleration to which a terminal (portable terminal 100) operated by the player is being subjected, from the acceleration measurement unit 60 as the instruction information 5c (input data) obtained from the input unit 40, and can output the acceleration information 5d to the rotation operation input unit 11.

The display processing unit 20 can generate the screen information 6f about a game screen on the basis of the operation object display output information 6b input from the operation object display output unit 12, the target object display output information 6c input from the target object display output unit 13, and the form determination information 6d input from the form determination unit 14, and can output the screen information 6f to the display unit 50.

The display processing unit 20 can determine whether the target object 2 hits (comes into contact with) the operation, object 1 by performing the following process, for example. The display processing unit 20 can determine that the operation object 1 and the target object 2 come into contact with each other if a distance α is smaller than the sum of a distance β1 and a distance β2 (α<⊕1+β2), the distance α being the distance from a predetermined position indicated by coordinates A (center coordinates of the operation object 1, for example) within an area where the operation object 1 is displayed to a predetermined position indicated by coordinates B (center coordinates of the target object 2, for example) within an area where the target object 2 is displayed, the distance β1 being the distance from the predetermined position indicated by the coordinates A to the outer edge of the operation object 1 (the surface of the area where the operation, object 1 is displayed, for example), the distance β2 being the distance from the predetermined position indicated by the coordinates B to the outer edge of the target object 2. In this way, the portable terminal 100 can accurately determine whether the target object 2 comes into contact with the operation object 1.

The input unit 40 can accept a touch operation performed by the player. In this embodiment, the input unit 40 may be a touch panel that is able to detect multi-touch operations. The input unit 40 can include the input screen 41 and the input control unit 42. Note, in some examples, that a method for input into the portable terminal 100 is not limited to a touch operation using the touch panel (input can be provided by pressing a certain input key, for example).

The input screen 41 may be a device (such as, but not limited to, a touch screen included in the touch panel, for example) which is able to detect a position specified by the player performing a touch operation. The input screen 41 outputs the touch signal 5a that corresponds to the specified position to the input control unit 42.

The input control unit 42 obtains the touch signal 5a from the input screen. 41 at a specific time interval and generates the coordinate information 5b from a series of the touch signals 5a.

The display unit 50 is a device that can display a game screen. In this exemplary embodiment, the display unit 50 may be a liquid crystal display, or any other type of display, as desired. Note that, in exemplary FIG. 1, the input unit 40 and the display unit 50 are separately illustrated in order to explicitly indicate functions that the two units respectively have. However, in a case where the input unit 40 is a touch panel, and the display unit 50 is a liquid crystal display, for example, it may be desired that the two units be integrated into one unit.

The acceleration measurement unit 60 can be a device that is able to measure an acceleration (vector quantity that, includes the magnitude and orientation) to which the portable terminal 100 is being subjected. The acceleration measurement unit 60 can be implemented as a gyro sensor, for example.

The storage unit 30 can be a storage device constituted by any recording medium, such as, but not limited to, a hard disk, a silicon state drive (SSD), a semiconductor memory, or digital versatile disc (DVD), and the like, and which can store the game program with which the portable terminal 100 is controllable and various types of data.

Figure 6:
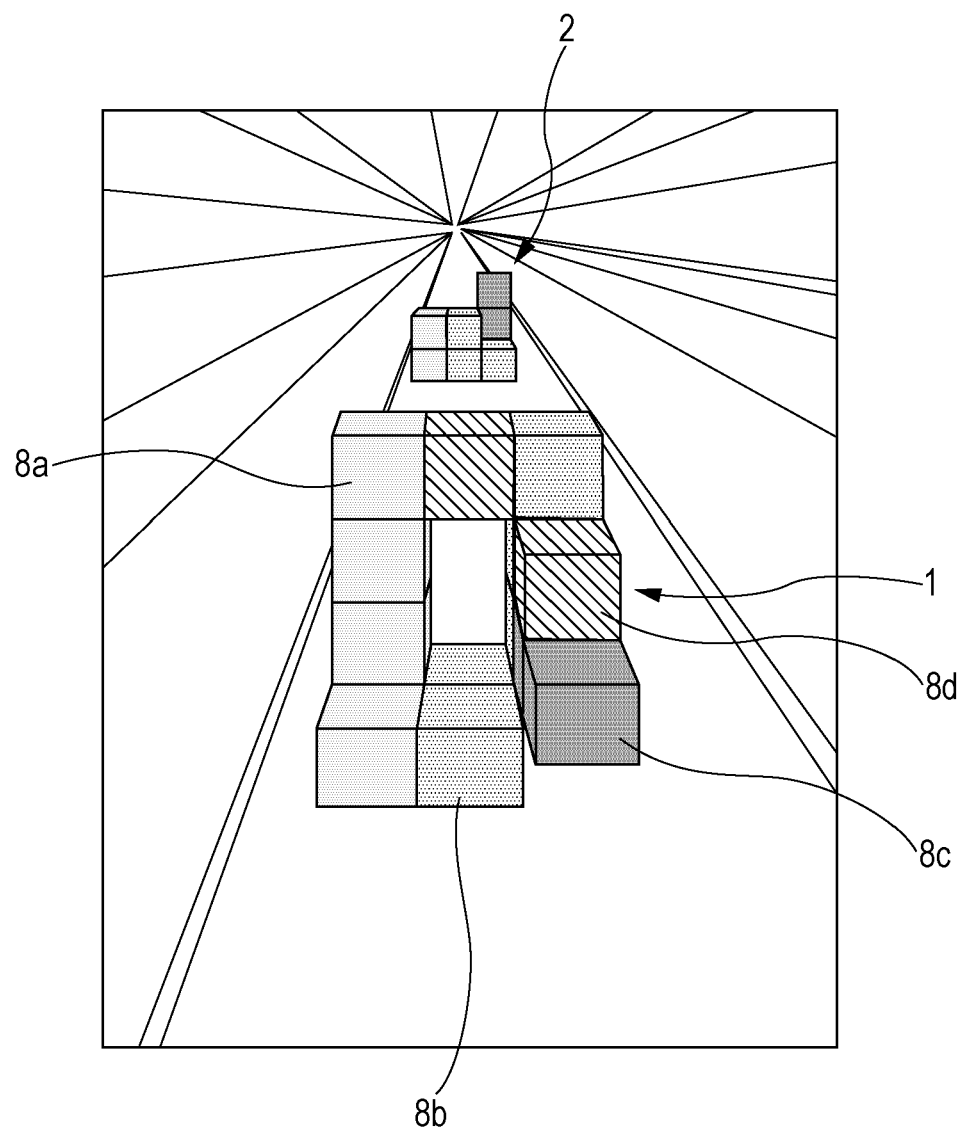
FIG. 6 is a schematic diagram illustrating an example of the operation object that is constituted by a plurality of object elements each associated with attribute information.

Exemplary FIG. 6 is a schematic diagram illustrating an example of the operation object 1 that is constituted by a plurality of object elements 8 each associated with attribute information. As illustrated in exemplary FIG. 6, the operation object 1 can be constituted by the object elements 8 (8a to 8d). Each of the object elements 8 is associated with attribute information. Here, attribute information can be information that indicates the characteristics (external appearance, for example) of each object element 8, and may be information indicating (4-1) the form, of the object element 8, (4-2) the color of the object element 8, (4-3) the pattern of the object element 8, or (4-4) a combination of (4-1) to (4-3), ox any other desired information. Similarly, the target, object 2 can be constituted by a plurality of object elements 8.

An example may be provided where it is assumed the operation object 1 is constituted by the number of object elements 8 that are respectively associated with pieces of attribute information indicating different colors, and the target object 2 is constituted by the same number of object elements 8 as the operation, object 1, for example. In this case, the player can change the certain direction from which the operation object 1 is displayed by matching the colors of the object elements 8 included in the operation object 1 with the colors of the object elements 8 included in the target object 2. In other words, the portable terminal 100 can give a hint, namely, information about "colors", to the player. Accordingly, the portable terminal 100 can entice the player into playing the game and increase the player's enthusiasm for the game.

Note, in some examples, that attribute information associated with each of the number of object elements 8 that constitute the operation object 1 and/or the target object 2 may be information relating to a bonus offered by the bonus offering unit 15. In a case where the number of object elements 8 that constitute the target object 2 include an object element 8 associated with a "wood" attribute, and if the player clears the target object 2, for example, the bonus offering unit 15 can offer a bonus relating to the "wood" attribute (an item that produces an effect of slowing actions of an enemy character, for example) to the player.

Figure 7:
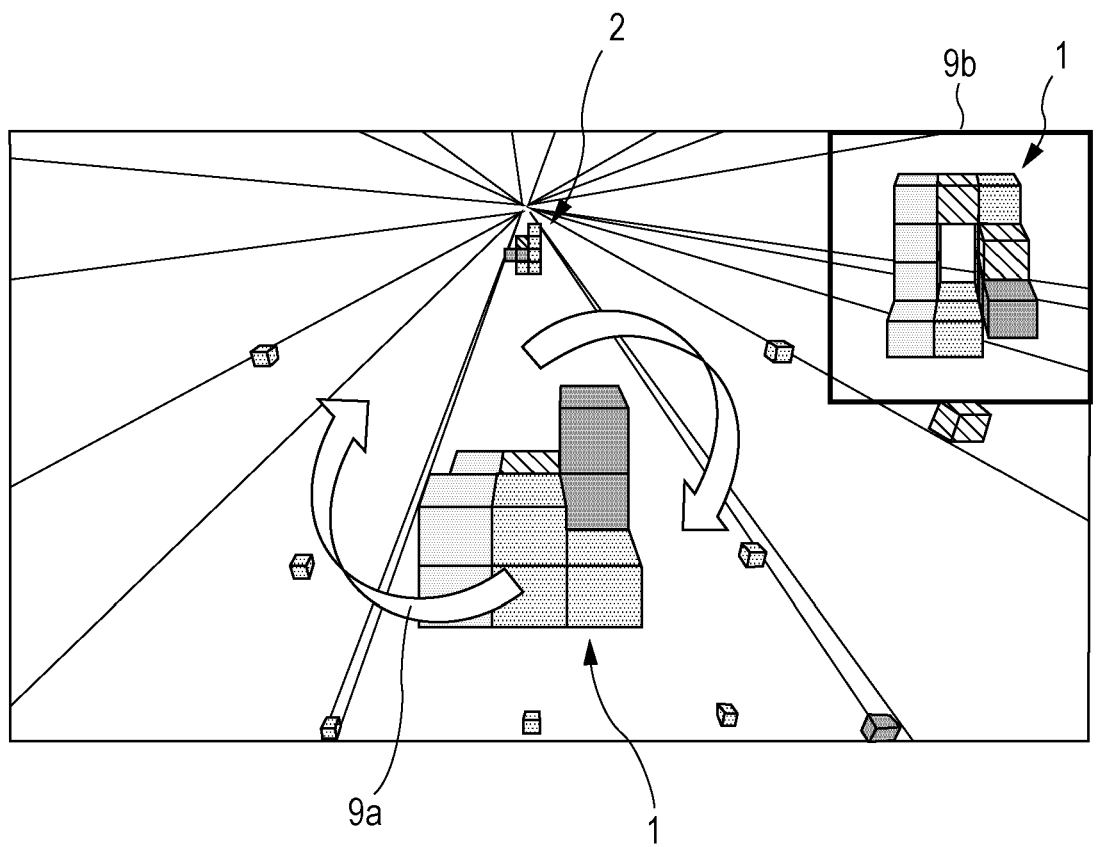
FIG. 7 is a schematic diagram illustrating an example of a game screen on which a hint that explicitly indicates a right rotation direction and a sub-screen on which the operation object is displayed from another direction are further displayed.

Exemplary FIG. 7 is a schematic diagram illustrating an example of a game screen on which a hint 9*a* that explicitly indicates a right rotation direction and a sub-screen 9*b* on which the operation object 1 is displayed from another direction are further displayed. As illustrated in exemplary FIG. 7, the portable terminal 100 can display a hint regarding a right direction in which the operation object 1 is to be rotated (that is, a right direction to which, the certain direction from which the operation object 1 is displayed is to be changed) in order to match the attitude of the operation object 1 with the attitude of the target object 2. As a result, it may be sufficient that the player inputs a change operation into the portable terminal 100 in accordance with the hint, and therefore, the player can easily play the game even if the player is a beginner. Accordingly, the portable terminal 100 can entice the player into playing the game and increase the player's enthusiasm for the game.

As illustrated in exemplary FIG. 7, the portable terminal 100 can further display the sub-screen 9*b* on which the operation object 1 is visible from a direction different from the certain direction from which the operation object 1 is displayed. As a result, the player can view the operation object 1 that is displayed in three dimensions from a different angle without changing the certain direction from which the operation object 1 is displayed. Accordingly, the portable terminal 100 can entice the player into playing the game and increase the player's enthusiasm for the game.

In some exemplary embodiments, it may be noted that the portable terminal 100 may display the target object 2 on the sub-screen 9*b* instead of the operation object 1 or together with the operation object 1 so as to be visible from a different direction. In this case, the portable terminal 100 may display the target object 2 on the sub-screen 9*b* such that the target object 2 automatically rotates. Accordingly, the portable terminal 100 can further entice the player into playing the game and further increase the player's enthusiasm for the game.

The portable terminal 100 can display the operation object 1 and/or the target object 2 such that part or all of the operation object 1 and/or the target object 2 is transparent in order to make the graphical scene easily viewable in the depth direction (direction towards the far side of the game screen). As a result, the player can more easily get a grasp of the form of the operation object 1 and/or the target object 2. Accordingly, the portable terminal 100 can further entice the player into playing the game and further increase the player's enthusiasm for the game.

In an exemplary case where the player inputs an operation for using a certain item, the portable terminal 100 can rotate the operation object 1 a specific number of times in directions so as to make the attitude of the operation object 1 match the attitude of the target object 2. In a case where the operation object 1 needs to be rotated five revolutions in a longitudinal direction and/or a lateral direction in order to match the attitude of the operation, object 1 with the attitude of the target object 2, for example, the portable terminal 100 can rotate the operation object 1 three revolutions in the directions so as to make the two attitudes match (that is, can automatically solve part of the puzzle). Accordingly, the portable terminal 100 can further entice the player into playing the game and further increase the player's enthusiasm for the game.

In the exemplary case where the player inputs an operation for using a certain item, the portable terminal 100 can change attribute information associated with each of the plurality of object elements 8 that constitute the operation object 1 and/or the target object 2. For example, the portable terminal 100 can change the attribute information so that the number of object elements 8 have distinctively different colors. As a result, the player can more clearly grasp the correspondence between the operation object 1 and the target object 2. Accordingly, the portable terminal 100 can further entice the player into playing the game and further increase the player's enthusiasm for the game.

As described above, in the portable terminal 100, the game can be designed to lower the difficulty level of the game, and therefore, the portable terminal 100 can provide a game that is quickly played even by beginners.

The target object display output unit 13 can simultaneously display a plurality of target objects 2. In this exemplary case, the player may need to find a plurality of attitudes of the operation object 1 that respectively match the attitudes of the plurality of target objects 2 within a time limit that is usually allowed in order to find one attitude of the operation object 1 that matches the attitude of one target object 2. As a result, the portable terminal 100 can increase the difficulty level of the game, thereby implementing a game that is worth playing even to skilled players.

The target, object display output unit 13 can display the target object 2 so that part or all of the target object 2 is invisible. For example, the amount of light emitted to a route along which the target object 2 moves from the far side to the near side of the game screen may change depending on a position on the route, and the target object 2 may change such that (5-1) the entire target object 2 is visible in a case where the target object 2 is moving through a position on the route to which a large amount of light is emitted, (5-2) only part of the target object 2 is visible (only the form is visible or only the color is visible, for example) in a case where the target object 2 is moving through a position, on the route to which a small amount of light is emitted, and (5-3) the target object 2 is invisible in a case where the target object 2 is moving through a position on the route to which no light is emitted. In this way, the portable terminal 100 can increase variations of the game and the difficulty level of the game, thereby implementing a game that is worth playing even to skilled players.

The target object display output unit 13 can display the target object 2 having a different form, in a different color, or having a different pattern, or in accordance with a combination thereof depending on the timing at which the target object 2 is to be displayed. For example, the target object display output unit 13 may display the target object 2 such that the color of the target object 2 changes depending on a position to which light is emitted towards the target object 2. Alternatively, the target object display output unit 13 may display the target object 2 such that the form of the target object 2 changes depending on a route along which the target object 2 moves. In this way, the portable terminal 100 can further increase variations of the game.

The target object display output unit 13 can display the target object 2 such that part or all of an image that represents the target object 2 is distorted and is difficult to view as if the target object 2 is sunk in water. In this case, the target object display output unit 13 can display the target object 2 such that the color of the target object 2 gradually becomes clear or the color and/or the form of the target object 2 changes as the target object 2 is passing through a layer in which the image of the target object 2 is distorted. In this way, the portable terminal 100 can further increase variations of the game.

Furthermore, the target object display output unit 13 can display the target object 2 such that only a mirror image of the target object 2 is visible. In this way, the portable terminal 100 can increase variations of the game and the difficulty level of the game, thereby implementing a game that is worth playing even to skilled players.

As described in the exemplary embodiments above, in the portable terminal 100, the game can be designed to increase the difficulty level of the game as well as variations of the game, and therefore, the portable terminal 100 can provide a game that is worth playing even to skilled players.

Figure 8:
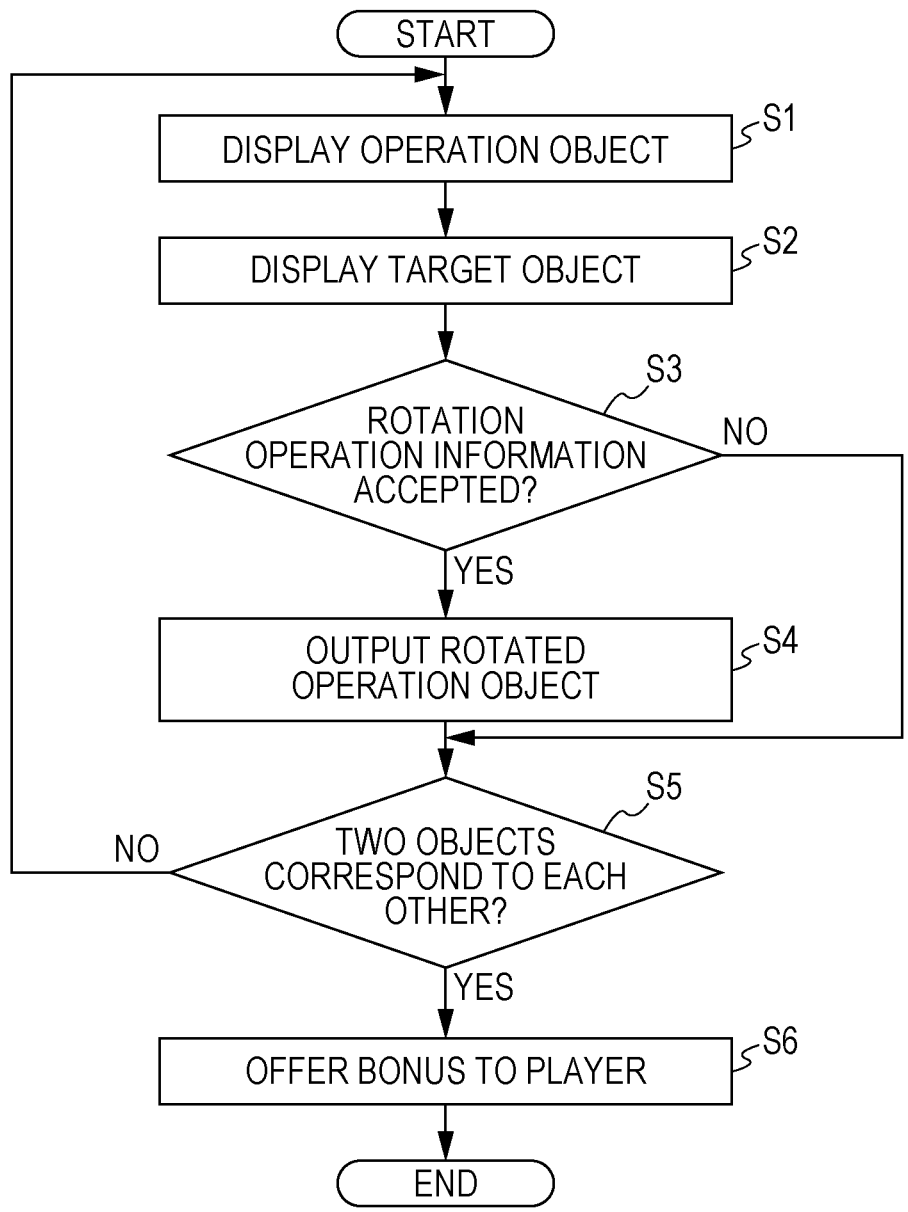
FIG. 8 is a flowchart illustrating an example of a process performed by the portable terminal; and Exemplary

Exemplary FIG. 8 is a flowchart illustrating an example of a process performed by the portable terminal 100. In a description given below, steps described in parentheses are steps included in a control method for the computer.

The input obtaining unit 18 can obtain input data from the player and generate the instruction information 5c. The operation object display output unit 12 can output display information for the operation object so as to allow output of display information for a certain face of the operation object having a three-dimensional form in the graphical scene (step S1 or operation object display information output step). The target object display output unit 13 can output display information for displaying a target face of the target object that can include a corresponding face corresponding to a specific face of the operation object (step S2 or target object display information output step).

If the rotation operation input unit (input function of accepting rotation operation information) 11 accepts rotation operation information for the operation object (Yes in step S3), the rotation operation input unit 11 can output the operation object that is rotated (step S4 or operation object display information output step). The form determination unit 14 can compare the certain face of the operation object that is rotated by the rotation operation input unit 11 with the target face of the target object to thereby determine whether the operation object and the target object correspond to each other (step S5 or form determination step).

If the rotation operation input unit 11 does not accept rotation operation information for the operation object (No in step S3), the form determination unit 14 can compare the certain face of the operation object with the target face of the target object to thereby determine whether the operation object and the target object correspond to each other (step S5 or form determination step).

If the form determination unit 14 determines that the operation object and the target object correspond to each other (Yes in step S5), the bonus offering unit 15 can offer a certain bonus to the player (step S6 or bonus offering step).

On the other hand, if the form determination unit 14 determines that the operation object and the target object do not correspond to each other (No in step S5), the flow can return to the operation object display information output step (step S1).

Note that the above-described exemplary control method may include any process performed by the units included in the control unit 10 in addition to the process described above with reference to exemplary FIG. 8.

An exemplary second embodiment of the present invention will be described with reference to exemplary FIG. 9. Note that, in the second exemplary embodiment, a description may be given only of a configuration different from those included in the first embodiment described above. All configurations described in the first exemplary embodiment can also be included in the exemplary second embodiment, and vice versa. The definitions of terms used in the first exemplary embodiment are also applied to the second exemplary embodiment.

Figure 9:
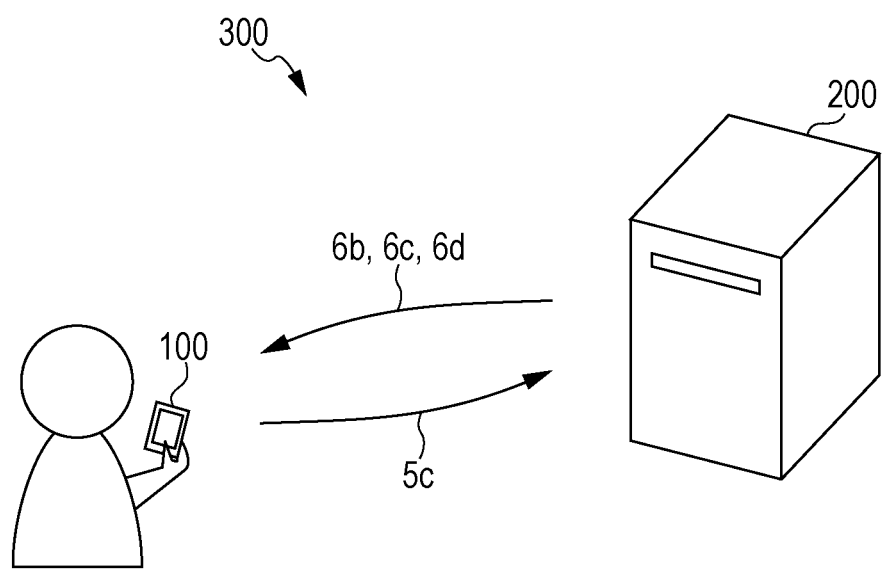
FIG. 9 is a schematic diagram illustrating a configuration of a game system that includes the portable terminal and a server apparatus according to an embodiment of the present, invention.

Exemplary FIG. 9 is a schematic diagram illustrating a configuration of a game system 300 that can include the portable terminal 100 and the server apparatus 200. As illustrated in exemplary FIG. 9, a case may be described where the computer according to the present exemplary embodiment functions as the server apparatus 200 that is connected to the portable terminal 100 over a certain network so as to enable communication, and the game program according to the present invention is executed on the server apparatus 200.

The server apparatus (computer) 200 can be an information processing apparatus that can include the control unit 10, which may be assumed to be included in the portable terminal 100 in the first exemplary embodiment, and that can execute the game program which can relate to part or all of the process described in the first embodiment. The server apparatus 200 can receive the instruction information (input data) 5c input by the player, over the certain network. The server apparatus 200 can output display information (target object display output information 6c) for displaying a target face of the target object that includes a corresponding face corresponding to a specific face of the operation object. The server apparatus 200 further can output display information (operation object display output information 6b) for the operation object that is rotated by the input function.

Next, the server apparatus 200 can accept rotation operation information so as to enable output of display information for a certain face of the operation object having a three-dimensional form in the graphical scene. The server apparatus 200 can determine whether the operation object and the target object correspond to each other by comparing the certain face of the operation object that is rotated by the input function with the target face of the target, and can output the form determination information 6d. Note that the display processing unit 20 included in the control unit 10 of the server apparatus 200 can generate, at any time, the screen information 6f about the puzzle game screen with which a result of a series of processing can be shown to the player, and transmits the screen information 6f to the portable terminal 100.

The portable terminal 100 can receive a result of playing the game (screen information 6f, for example) from the server apparatus 200 and can display the result on the display unit 50. Note that, in an exemplary case of displaying the result of playing the game using a Web browser, the portable terminal 100 can accumulate information received from the server apparatus 200 in a certain storage area (Web storage area) provided to the Web browser, for example.

As described in the examples above, a configuration, can be employed in which some or all of the above-described units (specifically, the control unit 10), which are assumed to be included in the portable terminal 100 in the first or second embodiment, are included in the server apparatus 200, and the server apparatus 200 transmits an output result of the game to the portable terminal 100 can transmit the basis of input into the portable terminal 100. Accordingly the server apparatus 200 can produce the same effect as the portable terminal 100 produces when the portable terminal 100 provides the above-described functions.

Note that, in some examples, the game may be a hybrid game for which the server apparatus 200 and the portable terminal 100 perform respective portions of the process. For example, a screen on which the game proceeds may be displayed on the portable terminal 100 on the basis of data generated by the server apparatus 200, that is, by way of Web display, and other screens, such as a menu screen, may be displayed by a native application installed on the portable terminal 100, that is, by way of native display.

Even if the game program according to the present exemplary embodiment is implemented as a native application that is executed on the portable terminal 100, the portable terminal 100 can access the server apparatus 200 as needed, and download and use information relating to the progress of the game (information about the player, information about other players who are friends of the player, information about accumulated points, items, and characters offered to the player, and ranking information about the player, for example). Furthermore, multi-playing of the game is possible in which the portable terminal 100 and another portable terminal are connected to each other so as to enable communication (peer-to-peer communication, such as short-range wireless communication using Bluetooth (registered trademark), for example) and operate in synchronization with each other.

As described with respect to the exemplary embodiments above, with the game program, the portable terminal 100 (computer), and the server apparatus 200 (computer) according to the exemplary embodiments, the operation object rotated by the input function that accepts rotation operation information is compared with the target object to thereby determine whether the operation object and the target object match. Accordingly, the game program and so on can produce an effect of increasing the attractiveness of the game because of good viewability and intuitive operability in the three-dimensional graphical scene.

A control block (specifically, the control unit 10) of the portable terminal 100 and the server apparatus 200 may be implemented as a logic circuit (hardware) formed in an integrated circuit (IC) chip or the like or as software by using a central processing unit (CPU). In the latter case, the portable terminal 100 and the server apparatus 200 each can include a CPU that executes instructions of the game program, which is software for implementing the individual functions, a read-only memory (ROM) or a storage device (referred to as "recording medium") to which the game program and various types of data are recorded so as to be readable by a computer (or CPU), a random access memory (RAM) to which the game program is loaded, and the like. By the computer (or CPU) reading the game program from the recording medium and executing the game program, the objective of the present invention is attained. As the recording medium, a "non-transitory tangible medium", such as a tape, a disc, a card, a semiconductor memory, a programmable logic circuit, or the like, can be used. In addition, the game program may be provided to the computer via any transmission medium desired (communication network or broadcast wave, for example) capable of transmitting the game program. The exemplary embodiments described herein can be implemented as a data signal on a carrier wave where the game program is embodied by way of electronic transmission.

Specifically, the game program according to the exemplary embodiments herein can make a computer (portable terminal IOC or server apparatus 200) execute the rotation operation input function, the operation object display output function, the target object display output function, the form determination function, the bonus offering function, the object moving function, the limitation function, and the acceleration obtaining function. The rotation operation input function, the operation object display output function, the target object display output function, the form determination function, the bonus offering function, the object, moving function, the limitation function, and the acceleration obtaining function can be respectively implemented by the rotation operation input unit 11, the operation object display output unit 12, the target, object display output unit 13, the form determination unit 14, the bonus offering unit 15, the object moving unit 16, the limitation unit 17, and the acceleration obtaining unit 19 described above. The details of the functions are as described above in the exemplary embodiments.

The game program can be written in, for example, a script language such as ActionScript or JavaScript® an object-oriented programming language such as Objective-C or Java® or a markup language such as HyperText Markup Language 5 (HTML5), or any other desired language. The game system 300 that can include an information processing terminal (portable terminal 100, for example) including units which implement some functions implemented by the game program and a server (server apparatus 200, for example) including units which implement the remaining functions different from the functions implemented by the units of the information processing terminal is also within the scope of the present invention.

The exemplary embodiments described herein are not limited to the embodiments described above and can be variously altered within the scope defined by the appended claims, and embodiments obtained by suitably combining technical means disclosed in different embodiments are also within the technical scope of the present invention. Further, a new technical feature can be formed by combining technical means disclosed in different embodiments.

The present invention is widely applicable to any computers, such as smartphones, tablet terminals, portable telephones, home video game machines, personal computers, server apparatuses, workstations, or mainframes.

What is claimed is:

1. A computer-implemented method for performing a process to make a game proceed, comprising executing on a processor the steps of:

accepting rotation operation information from a rotation operation input unit in a control unit of a computer for an operation object having a three-dimensional form in a graphical scene so as to enable output of display information on a display unit of the computer for a certain face of the operation object;

outputting display information from a target object display output unit in the control unit of the computer for displaying, on the display unit, a target face of a target object that includes a corresponding face corresponding to a specific face of the operation object;

outputting, by an operation object display output unit in the control unit of the computer, the display information for the certain face of the operation object that is rotated by the rotation operation input unit;

determining, with a form determination unit in the control unit of the computer, whether a shape of the operation object and a shape of the target object correspond to each other by comparing a form of the operation object in a first direction and a form of the target object in a second direction, the first direction being a direction perpendicular to the certain face of the operation object rotated by the rotation operation input unit and the second direction being a direction perpendicular to the target face of the target object and determining whether a relative position of the target face on the target object matches a relative position of the certain face on the operation object, the target face being at least some distance from the certain face during the determination step; and upon determining that the shape of the operation object and the shape of the target object correspond to one another and upon determining that the relative position of the target face on the target object matches the relative position of the certain face on the operation object, determining that a game clear condition has been met and updating the game to a game clear state.

2. The computer-implemented method for performing a process to make a game proceed to claim 1, wherein
at least one of the certain face and the target face are displayed in an enhanced manner by displaying at least one of the operation object and the target object in near two-dimensions.

3. The computer-implemented method according to claim 1, wherein
at least one of the certain face and the target face are displayed in an enhanced manner by reducing an angle of view of at least one of the operation object and the target object relative to a viewpoint of a player to a specific angle of view and displaying at least one of the operation object and the target object at the specific angle of view.

4. The computer-implemented method for performing a process to make a game proceed according to claim 1, further comprising executing on a processor the step of:
generating screen information, with a generation unit in the control unit of the computer, about a game screen with which progress of the game is grasped.

5. The computer-implemented method for performing a process to make a game proceed according to claim 1, further comprising executing on a processor the step of:
generating, with a map generation unit, in another graphical scene that includes content of the graphical scene, a map of the graphical scene in association with the screen information generated by the generation unit.

6. The computer-implemented method for performing a process to make a game proceed according to claim 1, further comprising executing on a processor the step of:
obtaining, by an acceleration obtaining unit in the control unit of the computer, from an acceleration measurement unit, information about an acceleration to which a terminal that is operated by a player is being subjected as the rotation operation information accepted by the input unit, wherein
in a rotation operation performed by the input unit, the operation object is rotated in accordance with the information about an acceleration obtained by the acceleration obtaining unit.

7. The computer-implemented method for performing a process to make a game proceed according to claim 1, wherein
in a rotation operation performed by the input unit, the operation object is rotated so as to make one of a front face, a back face, a left face, a right face, a top face, and a bottom face of the operation object face forward and to orient one of an upper side, a lower side, a left side, and a right side of the one of the faces of the operation object up.

8. The computer-implemented method for performing a process to make a game proceed according to claim 1, further comprising executing on a processor the step of:
placing a limitation on a time period, by a limitation unit in the control unit of the computer, during which the operation object is rotatable in a rotation operation performed by at least one of the input unit and on the number of times the operation object is rotatable in a rotation operation performed by the input unit.

9. The computer-implemented method for performing a process to make a game proceed according to claim 8, wherein
the limitation unit sets a time based on a speed at which at least one of the operation object and the target object moves and a distance from the operation object to the target object as a time limit.

10. The computer-implemented method for performing a process to make a game proceed according to claim 1, further comprising executing on a processor the step of:
moving, by an object moving unit, at least one of the operation object and the target object along at least one of three axes of three dimensions so as to make the operation object and the target object approach each other.

11. The computer-implemented method for performing a process to make a game proceed according to claim 1, further comprising executing on a processor the step of:
offering a certain bonus, by a bonus offering unit on the control unit of the computer, to a player in a case where the form determination unit determines that the operation object and the target object correspond to each other.

12. The computer-implemented method for performing a process to make a game proceed according to claim 1, wherein
the form determination unit determines whether the operation object and the target object correspond to each other by comparing the certain face of the operation object with the target face of the target object and determining whether one of the operation object and the target object fits into the other.

13. The computer-implemented method for performing a process to make a game proceed according to claim 1, wherein
at least one of the operation object and the target object are each constituted by a plurality of object elements, and
each of the plurality of object elements is associated with attribute information.

14. The computer-implemented method for performing a process to make a game proceed according to claim 13, wherein
the attribute information is information indicating a form, a color, a pattern, or a combination thereof of each of the plurality of object elements.

15. The computer-implemented method for performing a process to make a game proceed according to claim 13, wherein
the form determination unit determines whether the operation object and the target object correspond to each other by comparing the certain face of the operation object with the target face of the target object and determining whether at least part or all of attribute information about the target face matches attribute information about the certain face.

16. A non-transitory computer readable medium to provide a control method for a computer, that, when executed on a processor, perform the steps of:
inputting and accepting rotation operation information in a rotation operation input unit in a control unit of a computer for an operation object having a three-dimensional form in a graphical scene so as to enable output of display information for a certain face of the operation object;
outputting display information from a target object display output unit on the control unit of the computer on a display unit for displaying a target face of a target object that includes a corresponding face corresponding to a specific face of the operation object;
outputting the display information from an operation object display output unit on the control unit of the computer for the certain face of the operation object that is rotated in the input step;
determining whether a shape of the operation object and a shape of the target object correspond to each other by comparing, with a form determination unit on the control unit of the computer, a form of the operation object in a first direction and a form of the target object in a second direction, the first direction being a direction perpendicular to the certain face of the operation object rotated in the input step and the second direction being a direction perpendicular to the target face of the target object and determining whether a relative position of the target face on the target object matches a relative position of the certain face on the operation object, the target face being at least some distance from the certain face during the determination step; and
upon determining that the shape of the operation object and the shape of the target object correspond to one another and upon determining that the relative position of the target face on the target object matches the relative position of the certain face on the operation object, determining that a game clear condition has been met and updating the game to a game clear state.

17. A computer system for providing a game program, comprising:
a computer having at least one processor, at least one memory, and a display, the computer further comprising:
an input unit that accepts rotation operation information for an operation object having a three-dimensional form in a graphical scene so as to enable output of display information for a certain face of the operation object;
a target object display output unit that outputs display information for displaying a target face of a target object that includes a corresponding face corresponding to a specific face of the operation object;
an operation object display output unit that outputs the display information for the certain face of the operation object that is rotated by the input unit;
a form determination unit that determines whether a shape of the operation object and a shape of the target object correspond to each other by comparing a form of the operation object in a first direction and a form of the target object in a second direction, the first direction being a direction perpendicular to the certain face of the operation object rotated by the input unit and the second direction being a direction perpendicular to the target face of the target object and determines whether a relative position of the target face on the target object matches a relative position of the certain face on the operation object, the target face being at least some distance from the certain face during the determination step; and
the form determination unit further determines, upon determining that the shape of the operation object and the shape of the target object correspond to one another and upon determining that the relative position of the target face on the target object matches the relative position of the certain face on the operation object, that a game clear condition has been met and updates the game to a game clear state.

* * * * *